Figure 1:
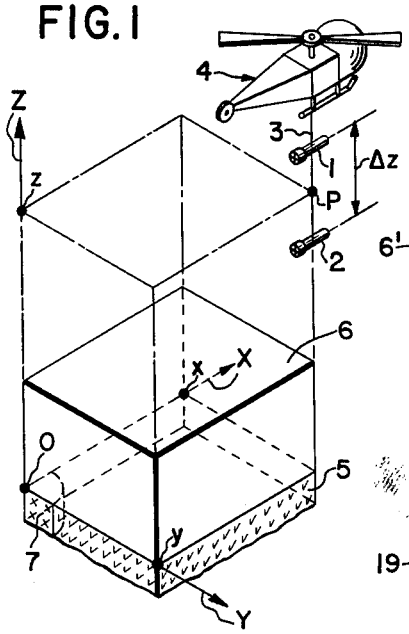

July 26, 1966　　K. A. RUDDOCK ETAL　　3,263,161
METHOD FOR DETERMINING DEPTH AND FALLOFF RATE OF
SUBTERRANEAN MAGNETIC DISTURBANCES UTILIZING
A PLURALITY OF MAGNETOMETERS
Filed March 26, 1963　　2 Sheets-Sheet 1

MAGNETIC NORTH

——— TOTAL FIELD (H)
— — — VERTICAL GRADIENT (ΔH/Δz)
——— TOPOGRAPHICAL RELIEF

INVENTORS
KENNETH A. RUDDOCK
HOWARD A. SLACK
SHELDON BREINER

BY

ATTORNEY

INVENTORS
KENNETH A. RUDDOCK
HOWARD A. SLACK
SHELDON BREINER
BY *Rosenblum*
ATTORNEY

United States Patent Office 3,263,161
Patented July 26, 1966

3,263,161
METHOD FOR DETERMINING DEPTH AND FALL-OFF RATE OF SUBTERRANEAN MAGNETIC DISTURBANCES UTILIZING A PLURALITY OF MAGNETOMETERS
Kenneth A. Ruddock, Palo Alto, Calif., Howard A. Slack, Crystal Lake, Ill., and Sheldon Breiner, Mountain View, Calif.; said Slack assignor to The Pure Oil Company, Palatine, Ill., a corporation of Ohio, and said Ruddock and said Breiner assignors to Varian Associates, Palo Alto, Calif., a corporation of California
Filed Mar. 26, 1963, Ser. No. 268,000
10 Claims. (Cl. 324—8)

The present invention relates in general to surface and aerial surveying of magnetic field anomalies caused by subterranean magnetic disturbances, and more particularly to a method of determining the depth and fall-off rate of such disturbances.

Abrupt contrasts in the magnetic susceptibility of adjacent subterranean volumes constitute sources of magnetic disturbances detectable by means of ground or aerial surveys of the earth's magnetic field. Heretofore such surveys have often been of limited value in view of difficulties in resolving and interpreting the data obtained.

For example in oil exploration, it is desirable to obtain knowledge of the structure of the igneous or metamorphic rock, known as the "basement." Any abrupt change in the structure of this rock is indicative of corresponding structural changes in the overlying sedimentary layers which may be favorable to the accumulation of oil in these layers. Since the basement rock contains magnetite and is therefore magnetic, such changes in the structure of the basement rock give rise to magnetic disturbances. A condition known as basement differentiation wherein adjacent portions of the rock have markedly different magnetite concentrations also gives rise to magnetic disturbances. Previous methods of magnetic anomaly surveying have inferred information of the depth and nature of such sources of disturbance by assuming that the disturbance arises from a magnetic body of some particular geometrical shape. The data obtained is not of sufficient accuracy to justify drilling operations until after a time-consuming and expensive ground survey is made using acoustical methods.

Thus the principal object of the present invention is to enable the making of magnetic surveys of greater exploratory value. Generally speaking, this is accomplished by making simultaneous measurements of total magnetic field intensity and the vertical gradient of this intensity, and then using these measurements to determine the depth and fall-off rate of subterranean magnetic disturbances.

Figure 2:
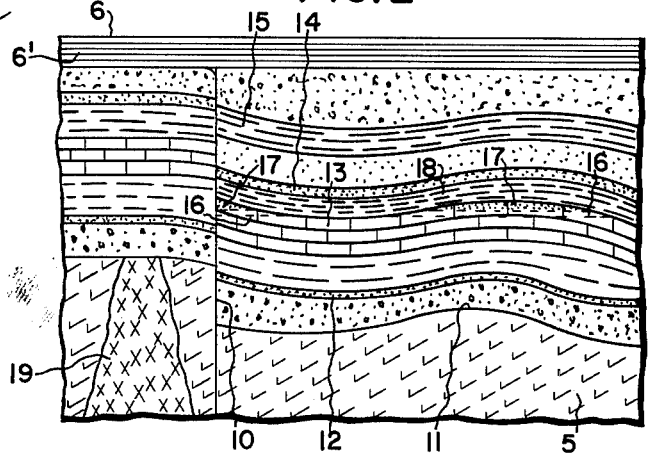
Figure 3:
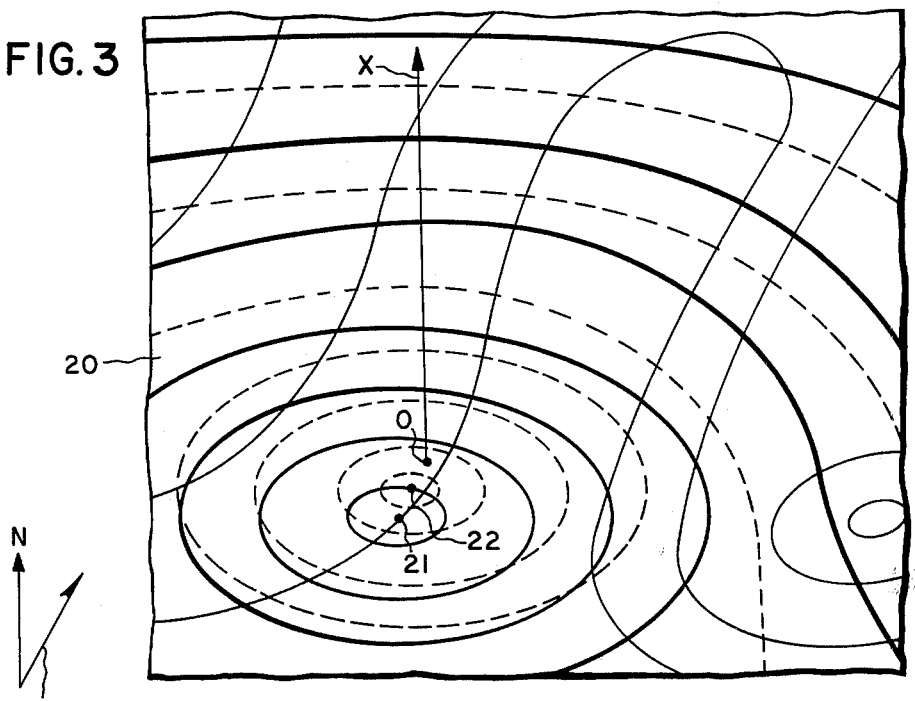
Figure 4:
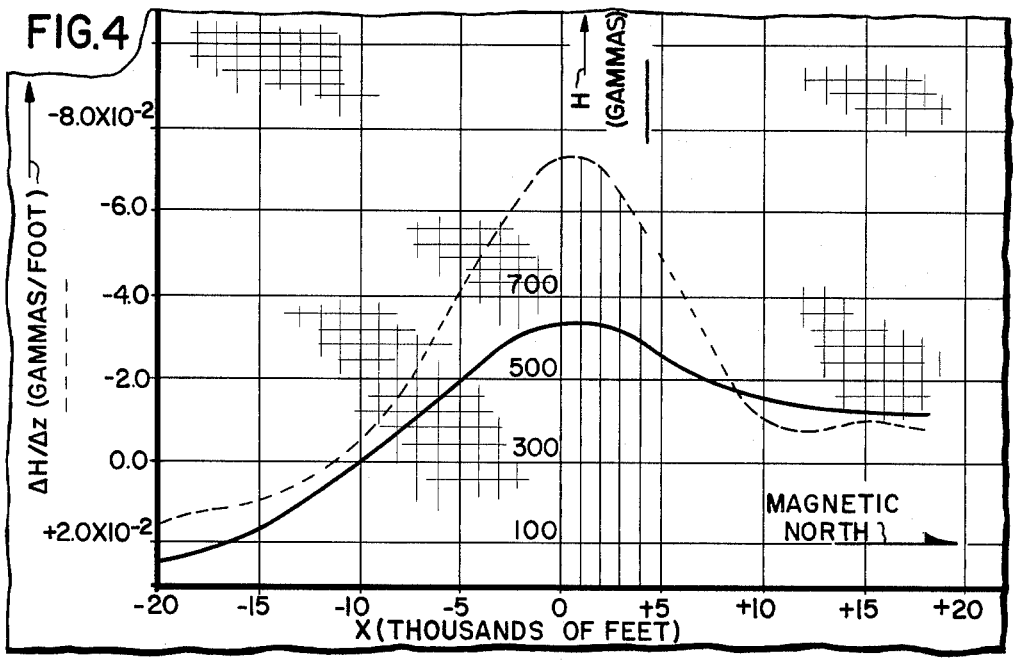
Figure 5:
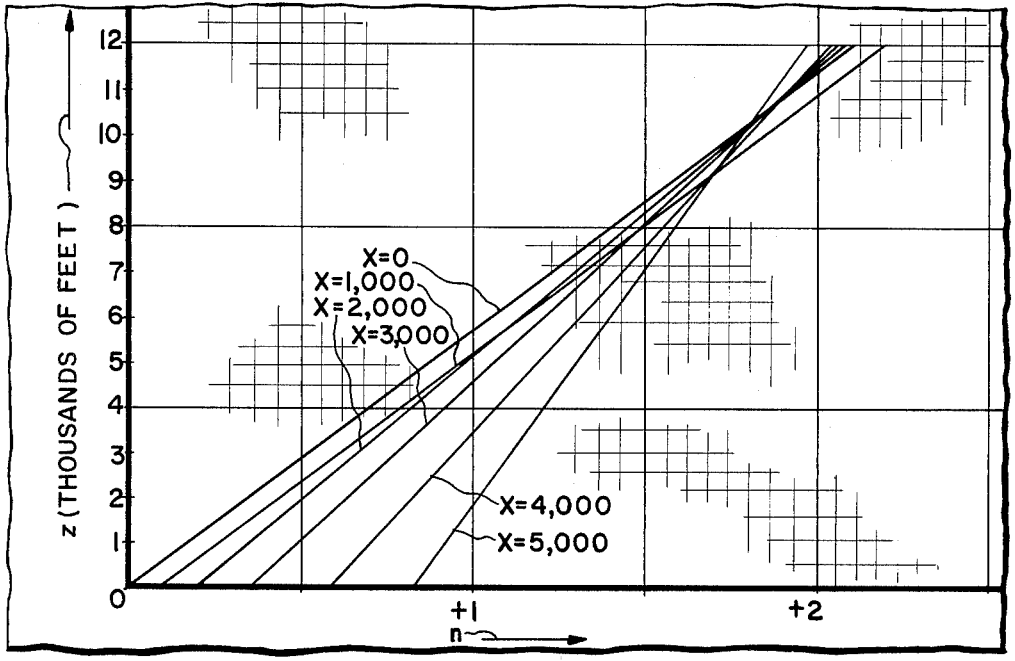

The various features and advantages of the present invention will become apparent upon a perusal of the drawings wherein:

FIG. 1 is an isometric sketch of the coordinate system used in explaining the present invention, FIG. 2 is a cross-sectional view of some subterranean formations with which the present invention is particularly concerned, FIG. 3 is a total field and vertical gradient contour plot constructed in accordance with the present invention, FIG. 4 is a total field and vertical gradient profile plot constructed in accordance with the present invention, and FIG. 5 is a plot of linear equations constructed in accordance with the present invention.

Anomalies in the earth's magnetic field caused by subterranean magnetic disturbances are of the general functional form $H=Kr^{-n}$, where H is the intensity of the anomaly at a distance $r$ from the center of the disturbance, K is a constant for any given disturbance and includes such properties as magnetic susceptibility contrast and size of magnetic body, and $n$ is the fall-off rate with distance $r$ of the intensity of the magnetic disturbance. Since this function is a homogeneous function of degree $n$, application of Euler's theorem gives the following relationship between the coordinates of an observation point P with respect to the disturbance, the total magnetic anomaly, and the space derivatives of the total magnetic anomaly:

$$(1) \quad x\frac{\partial H}{\partial x}+y\frac{\partial H}{\partial y}+z\frac{\partial H}{\partial z}=-nH$$

where $x$, $y$, $z$ are the Cartesian coordinates of the observation point P with respect to the center of the disturbance as origin, $z$ being the vertical coordinate and $x$, $y$ the coordinates in a horizontal plane.

FIG. 1 illustrates the coordinate system in the case of an aerial magnetic survey of the basement rock. The magnetometer sensing units are placed in aerodynamically stabilized birds 1 and 2 and supported in vertically spaced-apart relation by means of cable 3 suspended from helicopter 4 (or other suitable aircraft). The surface of the basement rock 5 is typically on the order of 10,000 feet below the surface of the earth 6. A portion 7 of the basement rock having a contrasting susceptibility gives rise to a magnetic disturbance. The $x$, $y$, $z$ coordinates of the observation point P, midway of the sensors 1 and 2, are taken from mutually perpendicular axes X, Y, Z with origin O at the central point of the magnetic disturbance.

According to the present invention, H and $\partial H/\partial z$ are measured using two vertically displaced magnetometers. The reading of either instrument (or for greater accuracy, when desired, the average of these readings) yields H, and the difference $\Delta H$ in reading between the two instruments divided by the vertical distance $\Delta z$ separating the instrument yields $\Delta H/\Delta z$ which is taken as a good approximation to $\partial H/\partial z$ (less than one percent error for $\Delta z \leq 0.10\ z$).

An optically pumped magnetometer, as disclosed, for example, in an article entitled "Principles of Operation of the Rubidium Vapor Magnetometer" by Arnold L. Bloom in the January 1962 issue of Applied Optics, is preferred in the practice of the present invention. Such magnetometers have a sensitivity of about .01 gamma and enable precise measurement of small field gradients at separations $\Delta z$ sufficiently small to be practical in connection with aerial or ground surveying equipment.

The derivatives $\partial H/\partial x$ and $\partial H/\partial y$ are determined from the $x$ and $y$ profiles of H at specific values of $x$ and $y$. This leaves two unknowns $z$ and $n$ which are determined by obtaining $\partial H/\partial z$, H, $\partial H/\partial x$, $\partial H/\partial y$, $x$ and $y$, for at least two points from the profiles of H and $\Delta H/\Delta z$. Substitution into Equation 1 yields a linear equation with unknowns $z$ and $n$ for each point. Values of $z$ and $n$ for a particular disturbance are then obtained from a simultaneous solution of these equations using graphical or other appropriate techniques. Since there are two unknowns, $z$ and $n$, only two such equations are required for a solution. However by using several equations (corresponding to measurements at several points), a statistical distribution of solutions is obtained which makes possible the calculation of the most probable values of $z$ and $n$ with a known standard deviation. Thus the present invention permits not only an accurate determination of the depth $z$ of the disturbance, but also the fall-off rate $n$ which is indicative of the extent and shape of the mass causing the detected anomaly.

An illustration of the significant advantages of this method is given in FIG. 2 which is a cross-section of some typical subterranean formations favorable to the accumulation of an oil deposit. The surface structure of the basement rock includes a fault 10 at which an abrupt step-like change in the surface level occurs, and also a rounded raised dome 11. These basement structures are associated with corresponding structure in the overlying sedimentary layers 12 through 15 which facilitates the trapping of oil 16 and gas 17 in a layer such as the limestone layer 13 capped by shale 18. Note that, in general, neither the ground surface structure 6 nor the uppermost sedimentary layers 6' give a visible indication of the underlying formation of interest.

The dome 11 gives rise to a magnetic disturbance characteristic of an isolated point source of magnetic dipoles with a fall-off rate, $n$, of three. If such a dome is extended horizontally in a single direction so as to take on the aspects of an anticlinal structure, $n$ assumes the value of two. The fault 10 gives rise to a magnetic disturbance characteristic of a horizontal array of magnetic dipoles extending to plus and minus infinity in the strike direction as well as to infinity in one direction perpendicular to the strike direction. For such a dipole array, $n$ takes on a value of one. A deeply extending basement differentiation such as 19 gives rise usually to a magnetic disturbance with a fall-off rate also of the order of one. If the aerial extent of the basement differentiation is small, $n$ can become equal to two. However such basement differentiation usually involves large magnetic susceptibility differences and thus produces a very intense magnetic disturbance. Magnetic disturbances caused by basement differentiation can also usually be distinguished from those caused by faults because the magnetic disturbance so caused is equi-dimensional rather than of linear extent as in the case of faults. Important indications of the general trend of the basement surface can be obtained from determinations of the depth $z$ to a number of basement differentiation sources whereas the disturbances due to actual structures such as 10 and 11 provide a more direct indication of a favorable oil bearing site. Consequently the present invention enables depths to be determined to all types of subsurface disturbances regardless of rate of fall-off with a greater accuracy then previous methods based on the assumption that fall-off rate is constant. Furthermore the knowledge gained by virtue of knowing rate of fall-off enables an interpreter to discriminate between the different types of magnetic disturbances causing the magnetic effect.

Typically, in the practice of the present invention, an area to be explored is traversed at a constant altitude in a grid-like pattern of flight lines. Measurements of H and $\Delta H/\Delta z$ are correlated with the particular point along the flight at which the measurements are made using well-known photographic and radio navigation techniques employed in aerial surveying. These position-correlated readings are then transferred to a graph or map of the region surveyed in order to construct contours of the total field H and vertical gradient $\Delta H/\Delta z$.

Such a construction is illustrated in FIG. 3. The magnetic data is plotted on a topographical relief map 20 of the area surveyed, the map having thin black lines representing contours of constant elevation. Points of substantially constant field intensity H are connected to form the thick black line contours, typically separated by an amount of ten gammas. And points of substantially constant vertical gradient $\Delta H/\Delta z$ are connected to form the broken line contours, typically separated by an amount of .01 gamma per foot. In the Northern Hemisphere, the center 22 of the anomaly in the vertical gradient of the earth's field lies in the direction of magnetic north from the center 21 of the anomaly in the total earth's field, with the center O of the subterranean magnetic disturbance giving rise to these anomalies lying magnetically north of both centers 21 and 22.

Referring again to Equation 1, sufficient data for solutions of $z$ and $n$ can, in general, be obtained by constructing profiles of H and $\Delta H/\Delta z$ in two mutual perpendicular (X and Y) directions in order to obtain $\partial H/\partial x$ and $\partial H/\partial y$ from the slope of these profiles. In order to simplify the calculations, it is desirable to construct the profiles along an X direction perpendicular to the H contours so that $$\frac{\partial H}{\partial y}=0$$

and/or have the profile pass through the origin O, so that $y=0$. Under these conditions, the second term, $$y\frac{\partial H}{\partial y}$$

drops out the equation.

In order to locate the origin O exactly, use is made of the form of Equation 1 at the center 21 of the H anomaly where $$\frac{\partial H}{\partial x}=\frac{\partial H}{\partial y}=0$$

Here Equation 1 reduces to the form $$z/n=H/\frac{\partial H}{\partial z}$$

the ratio on the right-hand side being ascertainable directly from the H and $\Delta H/\Delta z$ contours. This same ratio holds for that point on an X profile perpendicular to the H contours ($\partial H/\partial y=0$) where $x=0$ and also for that point on an intersecting Y profile where $y=0$, thus locating the origin.

A convenient procedure is to calculate the ratio $$H/\frac{\Delta H}{\Delta z}$$

for a few points in the estimated region of the origin O until finding a point at which this ratio is substantially the same as for the field anomaly peak 21. Taking this point as the origin, the X-axis is drawn in a direction substantially perpendicular to the H contours ($\partial H/\partial y=0$) as shown in FIG. 3. This has the advantage that even if $y$ and $\partial H/\partial y$ are slightly different from zero, the product $$y\frac{\partial H}{\partial y}$$

will be sufficiently small to be neglected in Equation 1. Now X profiles of H and $\Delta H/\Delta z$ are constructed. The reference point $x=0$ is relocated from the $$H/\frac{\Delta H}{\Delta z}$$

ratio. And finally the values of $x$, H and $\partial H/\partial x$ are taken from at least two points of the constructed profiles in order to solve for $z$ and $n$, the depth and fall-off rate of the magnetic disturbance.

The results of a successful test of the present invention are shown in FIGS. 4 and 5. In this case a contour map of the total field H for the area surveyed was already available, and from this map the peak 21 of the field anomaly was located. A flight line, taken as the X axis, was then established passing through this peak in the direction of magnetic north, it being assumed that this flight line would also pass through the center O of the subterranean disturbance so that $y=0$ at all points therealong.

FIG. 4 shows the H profile (solid line) and $\Delta H/\Delta z$ profile (broken line) constructed on rectangular coordinates paper from position-correlated measurement taken along this flight line at an altitude of 9700 feet, using two self-oscillating optically-pumped rubidium vapor magnetometers with a separation $\Delta z$ of 100 feet.

Both of these profiles possess an obvious regional gradient increasing from south to north which must be removed to obtain an accurate baseline for the anomaly being observed. The regional values to be subtracted, in this particular case, are $0.88 \times 10^{-2}$ gammas per foot in the case of the H profile and $0.66 \times 10^{-6}$ gammas per foot per foot in the case of the $\Delta H/\Delta z$ profile.

The origin $x=0$ is then located by finding the point at which the ratio $$H / \frac{\Delta H}{\Delta z}$$

is the same as for the peak of the total field anomaly. Values are taken from the profiles at a number of values of $x$, in this case at $x=0$, 1000, 2000, 3000, 4000 and 5000 feet. For each $x$ value, $\partial H/\partial x$ is obtained by determining the slope of the H profile. Values of $x$, $\partial H/\partial x$, $\partial H/\partial z$, and H are substituted into Equation 1 for each $x$ position, thereby giving a linear equation in the unknowns $z$ and $n$, which can be solved for these unknowns with a minimum of two such equations. If the flight had not crossed the center of the disturbance and hence $y \neq 0$, then $\partial H/\partial y$ would have had to be determined from the slope of a profile of H in the Y direction derived from the map of total magnetic intensity.

FIG. 5 illustrated a graphical method for solving for $z$ and $n$. The linear equation in $z$ and $n$ for each value of $x$ is plotted as a straight line on rectangular coordinates paper with $z$ and $n$ axes. The intersection points of these lines give a statistical distribution of the values of $z$ and $n$. The best estimate of the results for $z$ (depth to magnetic disturbance) and $n$ (fall off rate) are $z=11,200$ feet and $n=2$. These results are in good agreement with data obtained by an acoustical survey.

In order to obtain the most accurate results from the plotting method of FIG. 5 with a minimum of measurements, it is desirable to obtain lines whose slopes are as different as possible and hence whose point of intersection is as greatly resolved as possible. Such lines are obtained by choosing points $x$ in FIG. 4 which have the maximum difference in the ratio of $$H / \frac{\Delta H}{\Delta z}$$

this ratio being equal to the slope of the lines.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of determining the depth $z$ and fall-off rate $n$ of a subterranean magnetic disturbance below an area to be surveyed, comprising: determining the magnetic intensity H and the vertical gradient $\partial H/\partial z$ of the earth's magnetic field for at least two points of substantially constant elevation lying within the area to be surveyed; locating the horizontal coordinates $x$, $y$ of said points with respect to the center of said subterranean disturbance; constructing at least one profile of the total field H; determining the horizontal space derivatives $\partial H/\partial x$, $\partial H/\partial y$ from the slope of said profiles at said points, substituting the values of $x$, $y$, H, $\partial H/\partial x$, $\partial H/\partial y$, $\partial H/\partial z$ for said points in the equation $$x \frac{\partial H}{\partial x} + y \frac{\partial H}{\partial y} + z \frac{\partial H}{\partial z} = -nH$$

to thereby obtain at least two linear equations containing the unknowns $z$ and $n$, and solving said linear equations to determine the values of $z$ and $n$ for said disturbance.

2. The method of claim 1 wherein H and $\partial H/\partial z$ are determined by traversing the area to be surveyed at a constant elevation with two magnetometers supported in vertically spaced-apart relationship with a separation $\Delta z$, said separation $\Delta z$ being sufficiently small that $\partial H/\partial z$ can be determined from the difference in magnetic intensity $\Delta H$ between said magnetometers divided by the separation $\Delta z$.

3. The method of claim 2 wherein said magnetometers are optically-pumped magnetometers having a sensitivity on the order of .01 gamma.

4. The method of claim 1, including: recording H and $\partial H/\partial z$ at a plurality of points lying within the area to be surveyed, plotting the values of H on a map of the area surveyed, at the points at which the recordings were taken, and connecting points of substantially the same value to give contours, plotting the values recorded for $\partial H/\partial z$ on a map of the area surveyed at the points at which the recordings were taken and connecting points of substantially the same value to give contour lines, selecting at least two points representing a location on the surface, common to the H and $\partial H/\partial z$ contour maps, and substituting the values for said points, derived from said contour maps, in the equation $$x \frac{\partial H}{\partial x} + y \frac{\partial H}{\partial y} + z \frac{\partial H}{\partial z} = -nH$$

5. The method of claim 1 wherein the center of said subterranean magnetic disturbance is located by measuring the ratio of H to $\partial H/\partial z$ at the center of the anomaly in the earth's magnetic field created by said disturbance, and then locating points, removed from the center of said earth's field anomaly, at which this ratio is substantially equal to the value obtained at the center of said earth's field anomaly.

6. The method of claim 1 wherein said linear equations in $z$ and $n$ are plotted as straight lines on rectangular coordinates paper with $z$ and $n$ axes, the values of $z$ and $n$ being obtained from the intersection points of said lines.

7. The method of claim 6 wherein two lines of maximum difference in slope are obtained from the linear equations in $z$ and $n$ derived from field-determining points having a maximum difference in the ratio of H to $\partial H/\partial z$.

8. The method of determining the depth and rate of fall exponent of a subterranean magnetic anomaly below an area to be surveyed, comprising recording the magnetic intensity and vertical gradient of the earth's magnetic field at a plurality of points lying within the area to be surveyed, plotting the values of magnetic intensity on a map of the area surveyed, at the points at which the recordings were taken, and connecting points of substantially the same value to give contour lines, plotting the values recorded for vertical gradient on a map of the area surveyed at the points at which the recordings were taken and connecting points of substantially the same value to give contour lines, selecting a point representing a location on the surface, common to the intensity and the gradient maps, substituting valves for said points derived from said contour lines, in the following equation:

$$x \frac{\partial H}{\partial x} + y \frac{\partial H}{\partial y} + z \frac{\partial H}{\partial z} = -nH$$

where $x$ is the distance from the center of the anomaly to the point measured along the $x$ axis, $y$ is the distance from the center of the anomaly to the point measured along the $y$ axis perpendicular to the $x$ axis, $z$ is the vertical depth to the subsurface disturbance causing the magnetic anomaly, $n$ is the exponent of rate of fall-off of magnetic intensity and H is the magnetic intensity of the anomaly at the point $(x, y)$, and $$\frac{\partial H}{\partial x}, \frac{\partial H}{\partial y}, \frac{\partial H}{\partial z}$$

are the rates of change of H with change of $x$, $y$ and $z$, respectively, to give a linear equation with unknowns $z$ and $n$, selecting a different point representing a location on the surface, common to the intensity and gradient maps, and substituting the values for this point in the aforesaid equation, and solving the equations to determine the value of $z$ and $n$.

9. Method in accordance with claim 8 in which more than two points are selected to formulate more than two equations and solving the equations to obtain a plurality of valves for $z$ and $n$.

10. Method in accordance with claim 9 in which values for vertical gradient are obtained by simultaneously flying at least two magnetometers over the area to be surveyed, said magnetometers being vertically spaced a sufficient distance from each other to give a detectable recording.

No references cited.

WALTER L. CARLSON, *Primary Examiner.*

G. R. STRECKER, *Assistant Examiner.*